(12) United States Patent
Faust et al.

(10) Patent No.: US 6,579,482 B1
(45) Date of Patent: Jun. 17, 2003

(54) PROCESS FOR USE OF CRUMB RUBBER IN MOLDABLE FORMULATIONS

(75) Inventors: Thomas Faust, Corte Madera, CA (US); Fridrikh S. Diatchkovski, Hudson, NY (US); Gretchen Faust, Corte Madera, CA (US); Dmitri F. Diatchkovski, Hudson, NY (US)

(73) Assignee: Redwood Rubber LLC, Corte Madera, CA (US)

( * ) Notice: Subject to any disclaimer, the term of this patent is extended or adjusted under 35 U.S.C. 154(b) by 0 days.

(21) Appl. No.: 09/566,769

(22) Filed: May 8, 2000

Related U.S. Application Data

(63) Continuation of application No. 08/944,325, filed on Oct. 6, 1997, now abandoned.
(60) Provisional application No. 60/031,018, filed on Nov. 18, 1996.

(51) Int. Cl.$^7$ .............................. B29C 35/02; C08C 1/00
(52) U.S. Cl. ........................ 264/122; 264/911; 264/912
(58) Field of Search ................................ 264/109, 122, 264/911, 912

(56) References Cited

U.S. PATENT DOCUMENTS 6,025,424 A * 2/2000 Katsuki et al. ............. 423/635

* cited by examiner

Primary Examiner—Mary Lynn Theisen
(74) Attorney, Agent, or Firm—Stephen E. Baldwin

(57) ABSTRACT

Roofing tiles, sheet rubber, and other rubber-based articles are formed from devulcanized crumb rubber by compounding the rubber with sulfur, a compound containing bound water, and a flame retardant. The articles have a high rubber content and are moldable and formable without the need for added polymeric binders, and are self-extinguishing upon exposure to flame.

7 Claims, No Drawings

PROCESS FOR USE OF CRUMB RUBBER IN MOLDABLE FORMULATIONS

CROSS REFERENCE TO RELATED APPLICATION

This application is a continuation of Ser. No. 08/944,325, filed Oct. 6, 1997, now abandoned.

This specification contains subject matter in common with provisional patent application no. 60/031,018, filed Nov. 18, 1996, and hereby claims all benefits legally available from said provisional patent application. In addition, said provisional application is incorporated herein by reference.

BACKGROUND OF THE INVENTION

1. Field of the Invention

This invention resides in the technology of recycling waste rubber, particularly from used vehicle tires.

2. Background of the Invention

The Rubber Manufacturers Association reports that approximately two billion used tires have already been discarded in the United States and that the number discarded each year is approximately 250 million. Uncontrolled incineration is not an acceptable means of disposal of tire rubber, and burial in landfills is increasingly difficult as the availability of landfills diminishes.

To avoid the problems of disposal, various means have been developed to extract usable rubber from used tires. Reclamation processes generally begin with the comminution of the tire material into one-inch to two-inch tire chips, which are then used as an energy source in the generation of electricity and the production of paper and, cement. Tire chips that are ground to micron sizes are termed "crumb rubber." Crumb rubber is mixed with various polyurethanes, surface modifiers, polymers derived from maleic anhydride, or combinations of these additives in the manufacture of roofing materials, walk pads, carpet backings and pads, and flooring underlays.

Forming useful objects from crumb rubber generally requires the addition of various fillers and resins to the crumb rubber to adhere the particles together and to adjust the physical characteristics such as hardness, dimensional stability and wear resistance of the product. Examples of the types of fillers and resins used in preparing construction materials from crumb rubber are found in Crivelli et al., U.S. Pat. No. 5,258,222 (Nov. 2, 1993), which describes the incorporation of coarse siliceous grains and a polymerizable liquid binder. Aqueous dispersions of neoprene and other elastomeric dienes or of an epoxide monomer are cited as examples of suitable binders. These additives, and especially the binders, add considerably to the cost of the formulation, and by relying on the additives to control the properties of the finished product, this adds even further to the cost and complexity of the formulation and diminishes the amount of recycled rubber that can be used. Similar formulations are disclosed by several patents to Kiser (Environrmental, L.L.C.), U.S. Pat. No. 5,453,313 (Sep. 26, 1995), U.S. Pat. No. 5,525,399 (Jun. 11, 1996), U.S. Pat. No. 5,582,864 (Dec. 10, 1996), and U.S. Pat. No. 5,587,234 (Dec. 24, 1996). The binder in these formulations is an elastomeric polysulfide, which must comprise 50% or more by volume of the formulation. A still further formulation is that of Lanphier, U.S. Pat. No. 5,527,409 (Jun. 18, 1996), which includes a urethane binder and a compaction process to form the comminuted tire particles into a log, from which a sheet is then cut.

In addition to the expense of including these binders and the limitation that the binders place on the amount of tire rubber that can be included, the highly granular nature of the formulations limits the range of techniques that can be used to form them into products of the desired shape. In particular, the formulations in these reference patents are not suitable for injection or calender molding.

SUMMARY OF THE INVENTION

It has now been discovered that a formulation useful for preparing roofing materials and other rubber-based articles in a manner that provides a high degree of control over stiffness and other characteristics of the articles without the need for binders, is formed by:

(a) devulcanizing crumb rubber by conventional devulcanization methods to achieve a devulcanized material with a plasticity of less than 120 Mooney units, and preferably less than 80 Mooney units, and whose rheometer cure curve has a $T_{S2}$ value of greater than thirty seconds;

(b) formulating the devulcanized rubber with sulfur, a compound containing bound water, and a flame retardant.

The resulting formulation can be molded in various ways, including compression molding, extrusion molding, injection molding, and calender molding, and can be made with a rubber content exceeding 50% by weight (of the crumb rubber used in the formulation). In addition to being economical, the molded product is highly versatile in use, highly fire resistant, heat insulative and impermeable to moisture, and achieves these qualities at minimal cost. These qualities are further achievable without the inclusion of such additives as oxidants, heavy metals, or halogen-containing rubber additives. A quality of the molded product that makes it particularly useful for roofing materials is that upon ignition, the product will self-extinguish in less than ten seconds, generally less than five seconds, and often within zero to two seconds.

Further details of these and other features and advantages of the invention will be more fully understood from the description that follows.

DETAILED DESCRIPTION OF THE INVENTION AND PREFERRED EMBODIMENTS

Crumb rubber is formed from scrap rubber such as rubber tires in various ways. In general, the scrap rubber is first shredded by mechanical means, using a mechanical tire shredder such as a two-roll, grooved rubber mill. Liquid nitrogen or other cryogenic fluids followed by pulverization, a polar solvent to swell the rubber followed by shearing to reduce particle size, or high-pressure water. The rubber is both shredded and separated from additional components included in the scrap, such as steel or other cording materials, by conventional means. Particle comminution to a size range of approximately 18 to 80 mesh (1.0 mm to 0.177 mm) is preferred. Fibers and metal pieces are removed by such methods as air sorting, vibration, and the use of magnets. All of these techniques are well known in the art. Best results are achieved with crumb rubber that meets the ASTM Test Method D5603-96 standard for chemical analysis and metals and fiber content.

Methods of devulcanization of crumb rubber are likewise well known. Included among these are ultrasonic devulcanization, microwave devulcanization, autoclaving in steam at 10 atmospheres or greater, the use of solvents such as naphthas, terpenes, and dipentenes, the use of sulfur-containing chemicals such as aryl disulfides and high molecular weight mercaptans, and the application of shear forces at high pressure. Devulcanization methods that do not involve sulfur-containing chemicals are preferred, particularly ultrasonic devulcanization, steam devulcanization, or solvent devulcanization. The percentage of devulcanization can range from about 20% upward, although percentages of devulcanization, such as 40% or above, or 70% or above, are preferred. When the level of devulcanization is below 60%, additives such as chlorosulfonated polyethylene-CSM or equivalents can be added to improve the compounding of the formulation.

The degree of devulcanization is conveniently measured by various parameters used in the rubber reclamation industry. Relationships such as the number of Mooney units of the devulcanized rubber or the $T_{S2}$ value on the rheometer cure curve of the devulcanized rubber are indications of a level of devulcanization. The Mooney unit is a measure of the plasticity of the rubber, equal to the torque, measured on an arbitrary scale on a disk in a vessel that contains the rubber at a temperature of 100° C. and rotates at two revolutions per minute. The $T_{S2}$ value is taken from the cure curve at a particular temperature, generally in the range of 320–350° F. (195–212° C.) in which the y-axis is torque and the x-axis is time. The curve generally consists of an initial rise followed by a plateau which is in turn followed by a second rise. The $T_{S2}$ value is the time at the point in the curve where the second rise begins, and is also referred to as the "scorch time."

Devulcanized rubbers available from industrial suppliers generally contain various vulcanization accelerators. Included among these are guanidines, mercaptobenzothiazoles, sulfenamides, thiurams, and dithiocarbamates. In the preferred practice of this invention, these are retained in the formulation. In some cases, beneficial results can be obtained by the addition of melamine to the formulation. Since melamine acts as an accelerator, the amount added will usually vary with the amounts of accelerators that are still present in the devulcanized rubber. The amount added will therefore usually range from about 1 phr to about 8 phr (i.e., a melamine:rubber weight ratio of from about 0.01 to about 0.08; the term "phr" explained below), but in some cases larger amounts will be added at the discretion of the formulator.

The compound containing bound water can be any chemical compound or combination of compounds that contain water of hydration and that will release the water upon reaching the ignition temperature of the finished product. Examples of compounds of this type are hydrated metal oxides such as magnesium hydroxide, alumina trihydrate, and vermiculite. The amount of bound water may vary, but in general, compounds with higher amounts of bound water are preferred. The bound water content is preferably about 5% by weight or greater, more preferably 15% or greater, and most preferably 30% or greater. The effectiveness of the compound and such features as the uniformity of the formulation and the ease of injection molding may vary with the particle size of the compound. In most cases, best results will be obtained using particles whose largest linear dimension is in the range of from about 1 micron to about 50 microns. For vermiculite, the preferred particle size range is from about 2 microns to about 15 microns (largest linear dimension), and preferred vermiculites are natural vermiculites that exfoliate (release bound water) at a temperature below about 220° C., and in particular at approximately 205° C. For magnesium hydroxide and alumina trihydrate, the preferred range is from about 2 microns to about 30 microns.

The flame retardant can be any of the variety of flame retardants known for use in rubber compounding. In some cases, the hydrated compound of the preceding paragraph can serve as the flame retardant. Additional non-hydrated flame retardants are preferably included, however. One example is isopropylated triphenyl phosphate.

The proportions of the various ingredients can vary as well. As indicated above, however, it is desirable to use a high quantity of devulcanized crumb rubber. In preferred embodiments of the invention, the proportion of devulcanized crumb rubber in the formulation ranges from about 40% to about 90% by weight of the formulation prior to processing into the finished product. It is more preferred that the proportion of devulcanized rubber be in excess of 50% by weight of the formulation, and most preferably within the range of from about. 52% to about 75% by weight. The amount of sulfur added, as elemental sulfur,can likewise vary. A typical range of the sulfur:rubber weight ratio (the "rubber" in this ratio referring to the entire composition of the devulcanized crumb rubber) may be from about 0.03:1 to about 0.2:1. Preferably, the ratio is within the range of from about 0.06:1 to about 0.1:1.

The amount of the compound containing bound water can likewise vary. In most cases, best results will be obtained when the weight ratio of the compound to the rubber in the formulation is from about 0.25:1 to about 0.75:1. Similarly variable is the weight ratio of flame retardant to rubber, which is preferably from about 0.03:1 to about 0.2:1, and most preferably from about 0.06:1 to about 0.1:1, except when the same compound serves as both the flame retardant and the compound containing bound water. Similarly, a preferred range for the vulcanization accelerator is from about 0.05:1 to about 0.20:1.

The formulation is prepared by conventional rubber compounding techniques. One example is the use of a Banbury (two-blade or four-blade) mixer, such as that supplied by Farrell Corp., Ansonia, Conn., USA. Banbury mixers are well known in the rubber compounding industry. A Banbury mixer is a tangential processing machine that possess double flighted rotors and a ram, providing a mixing action between the rotors and the wall of the chamber. Another example are roll mills with two or three rolls. A third example is an extruder or intermeshing machine. Since heat is generated in each of these mixing devices and the curing of devulcanized rubber is initiated by heating, it is preferable to control the temperature of the formulation in the mixing device to reduce the exposure of the formulation to high temperatures while in the device. This will reduce or minimize the extent of curing that occurs in the device, leaving most if not all of the curing to the mold. For this reason, mixing devices that have a high shearing action and a shorter residence time are preferred, and hence extruders or intermeshing mixers are preferred over two-blade Banbury mixers. One example of a mixer of this type is that disclosed in Passoni (Pomini Farrel S.p.A.), U.S. Pat. No. 4,775,240 (Oct. 4, 1988). Another means of preventing premature curing is the inclusion of a prevulcanization inhibitor. An example is N-(cyclohexylthio)phthalimide, sold under the name SAN-TOGARD® PVI by Flexsys America, Akron, Ohio, USA. It is preferred to minimize additives of this type.

Once the formulation is prepared, it is molded into the shape of the ultimate product by either compression molding, extrusion molding or injection molding. With injection or extrusion molding at a temperature of about 360° F. (218° C.), the cure time is generally about 180 seconds or less. With compression molding at 320° F. (195° C.), the cure time is generally about ten minutes. Further conventional additives such as lubricants can be included to facilitate the molding process.

The materials used in the formulation, their proportions, and the compounding conditions and equipment can be selected or adjusted to produce products that have a variety of uses and meet a variety of different specifications. Non-reinforced black rubber sheets for use as roofing materials, for example, can be formed by this method to achieve a tensile strength minimum of 1035 psi (by ASTM Test Method D-412) and a die C tear minimum of 150 lb/inch (by ASTM Test Method D-624), and to meet the physical property requirements specified by the Rubber Manufacturers Association for non-reinforced vulcanized black EPDM rubber sheeting used in roofing applications.

The following formulations are offered for purposes of illustration, and are not intended to limit the scope of the invention. Each of these formulations uses ASTM D-5603-96 crumb rubber which is substantially devulcanized (DCR), obtained from TRC Industries, Inc., Stow, Ohio, USA, and Flow Polymers, Cleveland, Ohio, USA. Devulcanization was performed by steam autoclave and, the particle size was 10–80 mesh (1.68–0.177 mm sieve opening) loose or in sheet form. The retardant/plasticizer was REOFOS-65 or REOFOS-95, which is isopropylated triphenyl phosphate obtained from FMC Corporation, Chemical Products Group, Philadelphia, Pa., USA. The relative amounts are expressed in "phr", which stands for "parts/hundred rubber" and is conventional terminology used in the rubber compounding industry and designates parts by weight per 100 parts by weight of rubber. Weight percents are also stated. Accompanying each formulation is the result of a one-minute burn test, in terms of the time required for self-extinguishing of a flame. This was performed by directing a roofing torch with a medium flame to one spot of a 4-inch×4-inch (10.2 cm×10.2 cm) slab of the cured formulation. The flame was applied for one minute, after which the time required for the slab to self-extinguish was recorded. The test results were equivalent to determinations that the oxygen index rating was 36.9. to 39.0%.

| Formulation | Composition | phr | Weight % | Self-Extinguish Time (sec) - Fire Performance Rating* |
|---|---|---|---|---|
| A | DCR | 100 | 60.6 | 3 - $V_0$ |
|   | Mg(OH)$_2$ | 40 | 24 |   |
|   | Melamine | 10 | 6 |   |
|   | Sulfur | 5 | 1.8 |   |
|   | REOFOS-95 | 10 | 6 |   |
| B | DCR | 100 | 61 | 5 - $V_0$ |
|   | ATH**: 2–5μ | 40 | 24 |   |
|   | Melamine | 8 | 4.8 |   |
|   | Sulfur | 9 | 5.4 |   |
|   | REOFOS-95 | 7 | 6 |   |
| C | DCR | 100 | 52 | 10; 3; 2 - $V_0$ |
|   | Vermiculite | 26 | 14 |   |
|   | ATH: 22μ | 50 | 26 |   |
|   | Sulfur | 10 | 5 |   |
|   | REOFOS-95 | 6 | 3 |   |
| D | DCR | 100 | 57 | 5 - $V_0$ |
|   | ATH: 2–5μ | 30 | 17 |   |
|   | PVI*** | 1 |   |   |
|   | Mg(OH)$_2$ | 30 | 17 |   |
|   | Sulfur | 14 | 8 |   |
|   | REOFOS-95 | 6 | 3 |   |

*$V_0$: self-extinguishing in 0–10 seconds;
$V_1$: self-extinguishing in 11–30 seconds;
$V_2$: self-extinguishing in 31–60 seconds
**ATH: Alumina trihydrate
***PVI: SANTOGARD ® PVI prevulcanization inhibitor Roofing tiles prepared from any of the above formulations can be supplemented by the addition of a surface layer to add pigmentation or other surface ornamentation. One example of such a surface layer is the combination of an elastomer such as HYPALON® (chlorosulfonated polyethylene elastomer, DuPont, Wilmington, Del., USA); vermiculite or clay, alumina trihydrate, and a colored pigment. Typical amounts are the vermiculite or clay at 20–30 phr (relative to the elastomer), the alumina trihydrate at 20–30 phr, and the pigment at 5 phr. A typical surface layer formed from this material may have a thickness of 0.125 inch (0.32 cm) or less.

The durometer hardness of the cured product can be adjusted to a level ranging from over 90to as low as 45 by varying the amount of sulfur in the formulation within a typical range of from about 2 phr to about 14 phr. A high durometer hardness in the range of 82 to 92 can also be achieved by supplementing the: cure package with 10 to 20 phr of polypropylene (such as PRO-FAX® 6523, Motell USA, Wilmington, Del., USA), recycled polypropylene, or carbon black.

With certain formulations of this invention, depending on the level of devulcanization of the crumb rubber, it will be beneficial to add a flow disperser to the formulation to improve the flow characteristics of the formulation. One example is STRUKTOL® WB16, a resin blend available from Struktol Co., Stow, Ohio, USA.

The foregoing is offered primarily for purposes of illustration. Further modifications and substitutions that will be apparent to those skilled in the art can be made without departing from the spirit and scope of the invention.

What is claimed is:

1. A method for the preparation of molded nonflammable devulcanized rubber articles, said method comprising:
   combining said devulcanized rubber with sulfur and a flame retardant containing bound water to form a mixture;
   the flame retardant releasing the bound water at a temperature below the temperature at which the devulcanized rubber will bum when heated; and
   heating said mixture to effect plasticization and placing said mixture into a mold at a temperature below the temperature at which the flame retardant will release the bound water and for a time sufficient to cause curing of said mixture.

2. A method in accordance with claim 1 in which said compound containing bound water is a member selected from the group consisting of hydrated magnesium oxide, alumina trihydrate, and vermiculite.

3. A method in accordance with claim 1 in which said compound containing bound water has a bound water content of at least about 5%.

4. A method in accordance with claim 1 in which said compound containing bound water has a bound water content of at least about 15%.

5. A method in accordance with claim 1 in which said compound containing bound water has a bound water content of at least about 30%.

6. A method in accordance with claim 1 in which said sulfur and said devulcanized crumb rubber are present in said mixture formed in (b) at a sulfur:rubber weight ratio of from about 0.03:1 to about 0.2:1.

7. A method in accordance with claim 1 in which said sulphur and said devulcanized crumb rubber are present in said mixture formed in (b) at a sulphur:rubber weight ratio of from about 0.06:1 to 0.1:1.

* * * * *